US007359641B2

(12) United States Patent
Dallesasse et al.

(10) Patent No.: US 7,359,641 B2
(45) Date of Patent: Apr. 15, 2008

(54) MODULAR OPTICAL TRANSCEIVER

(75) Inventors: John Dallesasse, Geneva, IL (US);
Joseph Scheibenreif, Oswego, IL (US);
Bryan Noble, Oswego, IL (US);
Thomas Whitehead, Chicago, IL (US);
Paul Wachtel, Arlington Heights, IL (US); Bogdan Andrei, Lisle, IL (US);
Dean Richardson, Wilmette, IL (US);
Brett Lane, West Mont, IL (US);
Anthony Moretti, Saint Charles, IL (US); David McCallum, West Chicago, IL (US)

(73) Assignee: Emcore Corporation, Albuquerque, NM (US)

( * ) Notice: Subject to any disclaimer, the term of this patent is extended or adjusted under 35 U.S.C. 154(b) by 537 days.

(21) Appl. No.: 10/879,775

(22) Filed: Jun. 28, 2004

(65) Prior Publication Data

US 2005/0084269 A1 Apr. 21, 2005

(51) Int. Cl.
*H04B 10/24* (2006.01)
(52) U.S. Cl. .................................... 398/135
(58) Field of Classification Search ......... 398/135–139
See application file for complete search history.

(56) References Cited

U.S. PATENT DOCUMENTS

| 4,441,181 | A | 4/1984 | Winzer et al. | |
|---|---|---|---|---|
| 6,975,642 | B2 * | 12/2005 | Levinson et al. | 370/445 |
| 7,003,230 | B2 * | 2/2006 | Branch et al. | 361/728 |
| 7,242,824 | B2 | 7/2007 | Scheibenreif et al. | |
| 2002/0067619 | A1 * | 6/2002 | Ikeda et al. | 362/512 |
| 2003/0151600 | A1 * | 8/2003 | Takeuchi et al. | 345/204 |
| 2004/0022544 | A1 * | 2/2004 | Case et al. | 398/137 |
| 2004/0030805 | A1 * | 2/2004 | Fujimori et al. | 709/250 |
| 2004/0190274 | A1 * | 9/2004 | Saito et al. | 361/783 |
| 2006/0067619 | A1 * | 3/2006 | Welch et al. | 385/37 |
| 2006/0126306 | A1 * | 6/2006 | Blair et al. | 361/716 |

FOREIGN PATENT DOCUMENTS

WO   WO 01/52454 A1   7/2001

OTHER PUBLICATIONS

"Agilent Technologies HFCT-7901XB10 GBASE-LR Xenpak Transceiver Product Overview", Anonymous Internet Article, Jan. 30, 2003, XP002296738 (URL: http://cp.literature.agilent.com/litweb/pdf/5988-7666EN.pdf).

(Continued)

*Primary Examiner*—Leslie Pascal

(57) ABSTRACT

An optical transceiver converting and coupling an information-containing electrical signal with an optical fiber including a housing conforming to the industry standard XENPAK™ form factor including an electrical connector for coupling with an external electrical cable or information system device and for transmitting and/or receiving an information-containing electrical communications signal, and a fiber optic connector adapted for coupling with an external optical fiber for transmitting and/or receiving an optical communications signal. At least one electro-optical subassembly is provided in the housing for converting between an information-containing electrical signal and a modulated optical signal corresponding to the electrical signal, along with a modular, interchangeable communications protocol processing printed circuit board in the housing for processing the communications signal into a predetermined electrical or optical communications protocol, such as the IEEE 802.3ae 10 Gigabit BASE LX4 physical layer.

23 Claims, 5 Drawing Sheets

OTHER PUBLICATIONS

"Infienon Technologies Paroli 2 Parallel Optical Link Module Description", Anonymous Internet Article, Feb. 2003, XP002296739 (URL: http://infineon.com/cm_upload/documents/037/667/Paroli_B159-H8007-G2-X-7600.pdf).

"Finisar Corporation 1000BASE-T Copper GBIC Transceivers FCM-8520/8521-3 Product Specifcation Rev.A" Anonymous, Feb. 2003 (URL: http://finisar.com/optics/documents/site2_2053158015_FCM-8520-3_and_FCM-8521-3_Spec_RevA.pdf).

Anonymous, "Agilent Technologies HFCT-701XB10 BGASE-LR Xenpak Transceiver Product Overview", Internet Article, Jan. 30, 2003, XP002296738.

Anonymous, "Infineon Technologies Paroli 2 Parallel Optical Link Module Description", Internet Article, Feb. 2003, XP002296739.

Anonymous, "Finisar Corporation 1000BASE-T Copper GBIC Transceivers FCM-8520/8521-3 Product Specification Rev.A", Internet Article, Feb. 2003, XP002296740.

Xenpak MSA Rev. 3.0, A Cooperation Agreement for 10 Gigabit Ethernet Transceiver Package, Sep. 18, 2002.

IEEE Std 802.3ae-2002, Aug. 30, 2002.

* cited by examiner

MODULAR OPTICAL TRANSCEIVER

REFERENCE TO RELATED APPLICATIONS

This application is related to copending U.S. patent application Ser. No. 10/866,265 filed Jun. 14, 2004, assigned to the common assignee.

BACKGROUND OF THE INVENTION

1. Field of the Invention

The invention relates to optical transceivers, and in particular to coupling assembles or modules that provide a communications interface between a computer or communications unit having an electrical input/output connector or interface and an optical fiber, such as used in fiber optic communications links.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. Traditionally, optical receive sections include an optical assembly to focus or direct the light from the optical fiber onto a photodetector, which in turn, is connected to an amplifier/limiter circuit on a circuit board. The photodetector or photodiode is typically packaged in a hermetically sealed package in order to protect it from harsh environmental conditions. The photodiodes are semiconductors chips that are typically a few hundred microns to a couple of millimeters wide and 100-500 microns thick. The package in which they are mounted is typically 3-6 mm in diameter, 2-5 mm tall and has several electrical leads coming out of the package. These electrical leads are then soldered to the circuit board containing the amplifier/limiter.

SUMMARY OF THE INVENTION

1. Objects of the Invention

It is an object of the present to provide an improved optical transceiver using modular, interchangeable transmitter and receiver subassemblies.

It is another object of the present invention to provide a transceiver for use with different optical transmission systems and optoelectronic components.

It is also another object of the present invention to provide an optical transceiver for use in an optical transmission system with an industry standard XENPAK housing.

It is still another object of the present invention to provide an optical transceiver for use in an optical wavelength division multiplexed (WDM) transmission system suitable for short range and long haul applications.

It is still another object of the present invention to provide an optical transceiver capable of field upgrades of both hardware and software modules.

It is still another an object of the present to provide improved heat dissipation in an optical transceiver by using heat conductive pathways from the transmitter subassembly to the housing or case.

It is still another object of the present invention to provide improved EMI shielding in an optical transceiver by using interdigitated or meshed metal castellations on the housing and a cover component respectfully.

It is also another object of the present invention to provide an optical transceiver for use in an optical transmission system with key components packaged in hermetically sealed enclosures to protect them from exposure to environmental conditions.

It is still another object of the present invention to provide an optical transceiver that is easily manufacturable by using simplified optical component mounting and alignment techniques.

2. Features of the Invention

Briefly, and in general terms, the present invention provides an optical transceiver for converting and coupling an information-containing electrical signal with an optical fiber including a housing including an electrical connector for coupling with an external electrical cable or information system device and a fiber optic connector adapted for coupling with an external optical fiber; at least one electro-optical subassembly in the housing for converting between an information-containing electrical signal and a modulated optical signal corresponding to the electrical signal; and a communications protocol processing subassembly in the housing for processing the communications signal into a predetermined electrical or optical communications protocol.

In another aspect of the invention, there is provided a transmitter subassembly including first and second lasers operating at different wavelengths and modulated with respective first and second electrical signals for emitting first and second laser light beams; and an optical multiplexer for receiving the first and second beams and multiplexing the respective optical signals into a single multi-wavelength beam that is coupled to a fiber optic connector for transmitting the optical signal to an external optical fiber.

In still another aspect of the invention, there is provided a receiver subassembly including an optical demultiplexer coupled to a fiber optic connector for receiving a multi-wavelength optical signal having a plurality of information-containing signals each with a different predetermined wavelength. The optical demultiplexer functions to convert the optical signal into distinct optical beams corresponding to the predetermined wavelengths. The subassembly includes a substrate forming an optical reference plane and including first and second photodiodes disposed thereon in the path of the first and second beams respectively.

In another aspect of the invention, the invention provide a protocol processing subassembly that includes modular reprogrammable or interchangeable firm subcomponents, such as electrically variable programmable read only memory. Such subcomponent enable simplified manufacturability and mass customization for a wide variety of different communications protocols, range options, or applications. It also enables the unit to be quickly reconfigured to handle a different protocol. Physical layer, or upper media access control layers, by simply removing one printed circuit board and substituting another, or reprogramming an EEPROM on the board.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
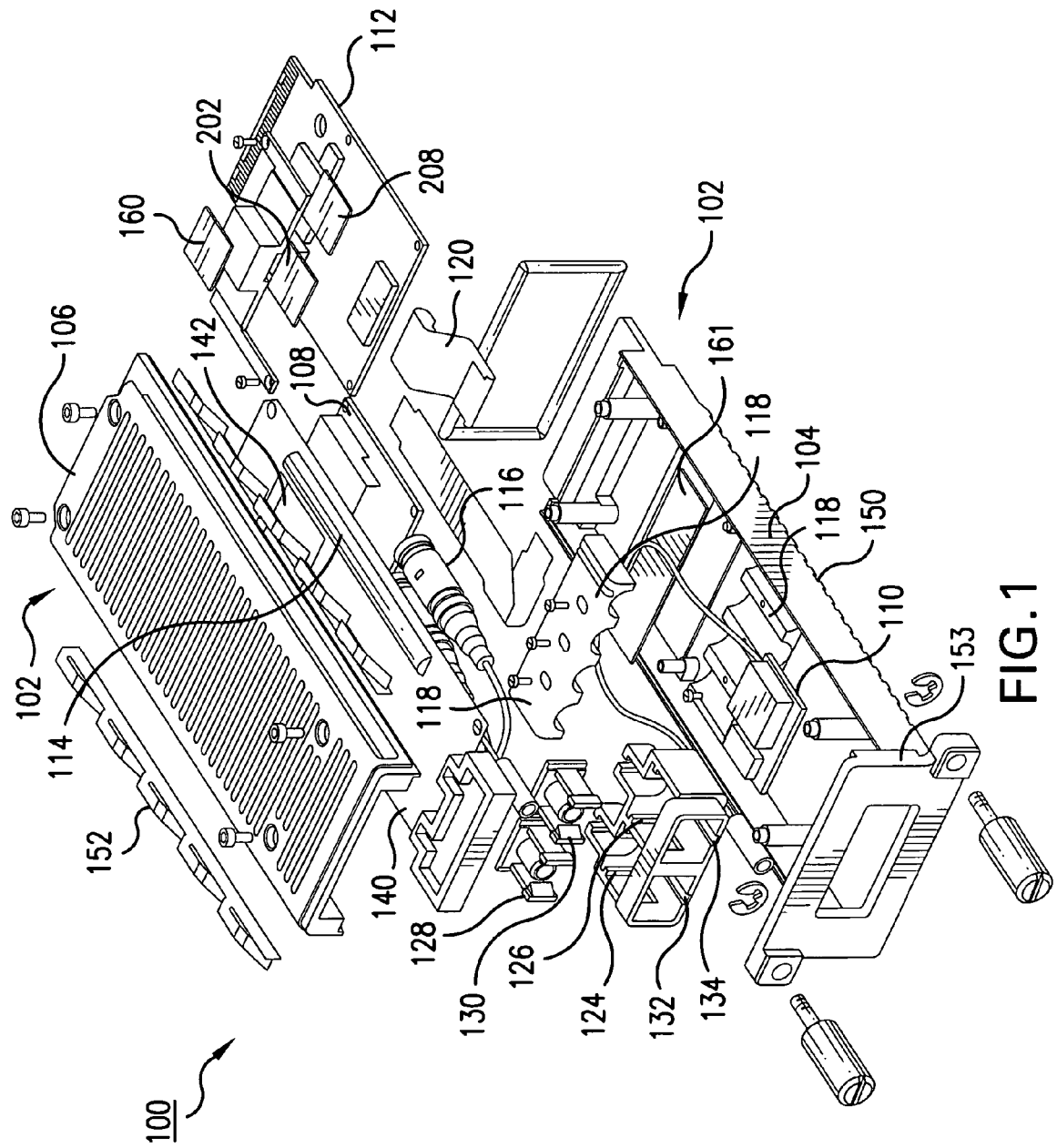
FIG. 1 is an exploded perspective view of an optical transceiver in an exemplary embodiment in accordance with aspects of the present invention.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Referring more particularly to FIG. 1, there is provided an optical transceiver 100 for operating over both multimode (MM) and single mode (SM) fiber using multiple laser light sources, multiple photodetectors, and an optical multiplexing and demultiplexing system. This enables a single transceiver module to communicate over multiple protocols and at maximum distance goals. The transceiver 100 and its housing 102 are designed such that maximum operating efficiency is achieved cost effectively and at reduced electromagnetic interference (EMI) and thermal levels in an industry standard form factor or package design.

Advantageously, the transceiver 100 is manufactured in a modular manner preferably using three separately mounted circuit boards mounted in the housing—a transmitter subassembly, a receiver subassembly, and a protocol processing board, with each board having dedicated functions and electrically connected to each other using either flex circuitry, mating multi-pin connectors, land grid arrays, or other electrical interconnect devices. This enables the basic transceiver module to be configured to different protocols and to support different optoelectronic devices using a simple subassembly configuration change, thus minimizing manufacturing costs and eliminating the need for manufacturing different transceivers for each different application. In addition, the use of flex circuitry or detachable connectors to interconnect the boards allows for a modular interchangeable board design (e.g., receiver, transmitter and PCS functionality each on separate boards). Although the preferred design uses three boards, any two of the functions may be combined on a single board for an even more compact design.

The modularity of the board design also enables the placement of heat-sensitive components in the optimal location with respect to the heat-generating components (lasers and ICs) within the module housing 102. It also makes it convenient and realistic to test and troubleshoot separate modular subassemblies independently before final assembly. In addition, the flex or other interconnects allow for manufacturing of the various boards (RX, TX, PCS) to proceed in parallel instead of in serial, hence reducing the manufacturing time for the entire unit.

Figure 2:
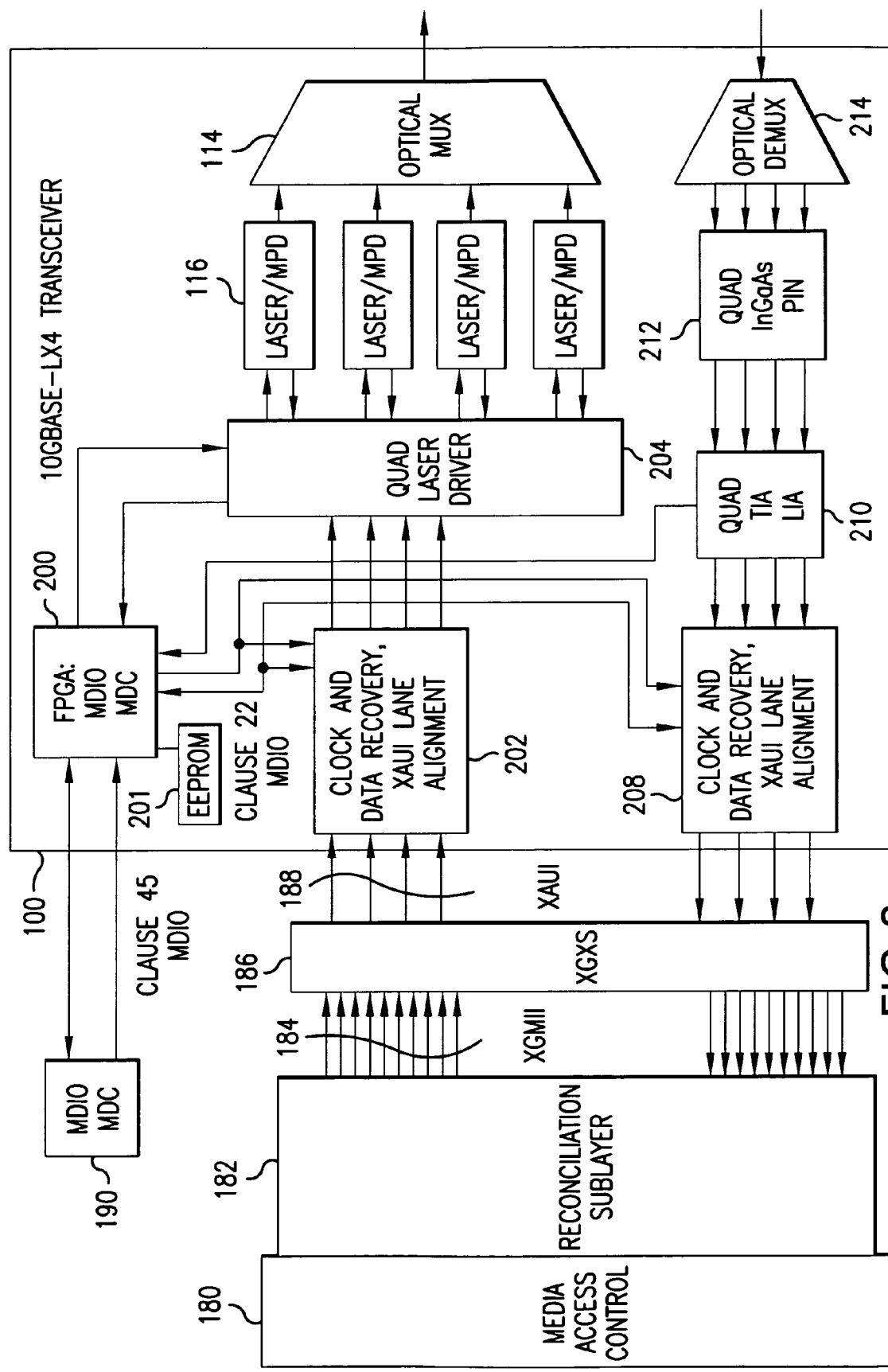
FIG. 2 is a highly simplified block diagram of the functional components of the transceiver of FIG. 1.
Figure 3:
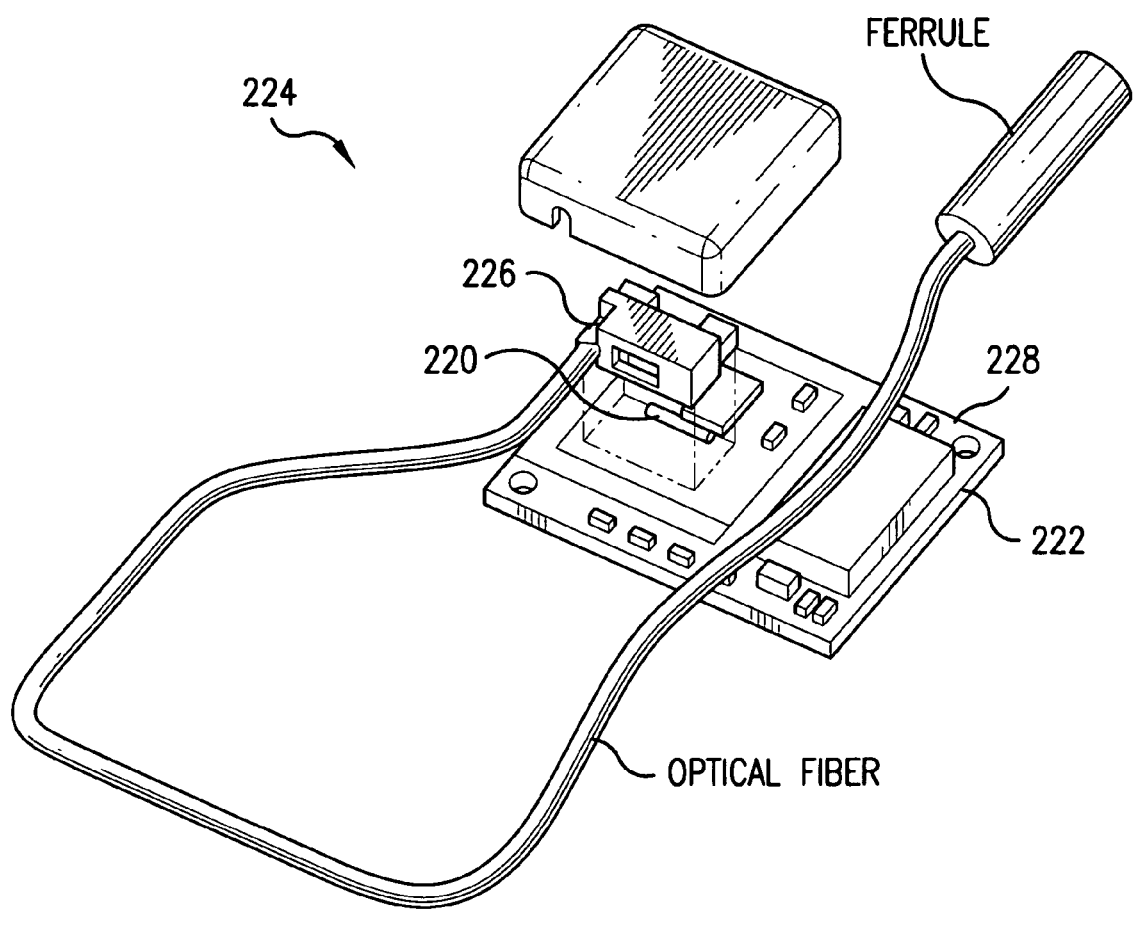
FIG. 3 is an exploded perspective view of the receiver subassembly.
Figure 4:
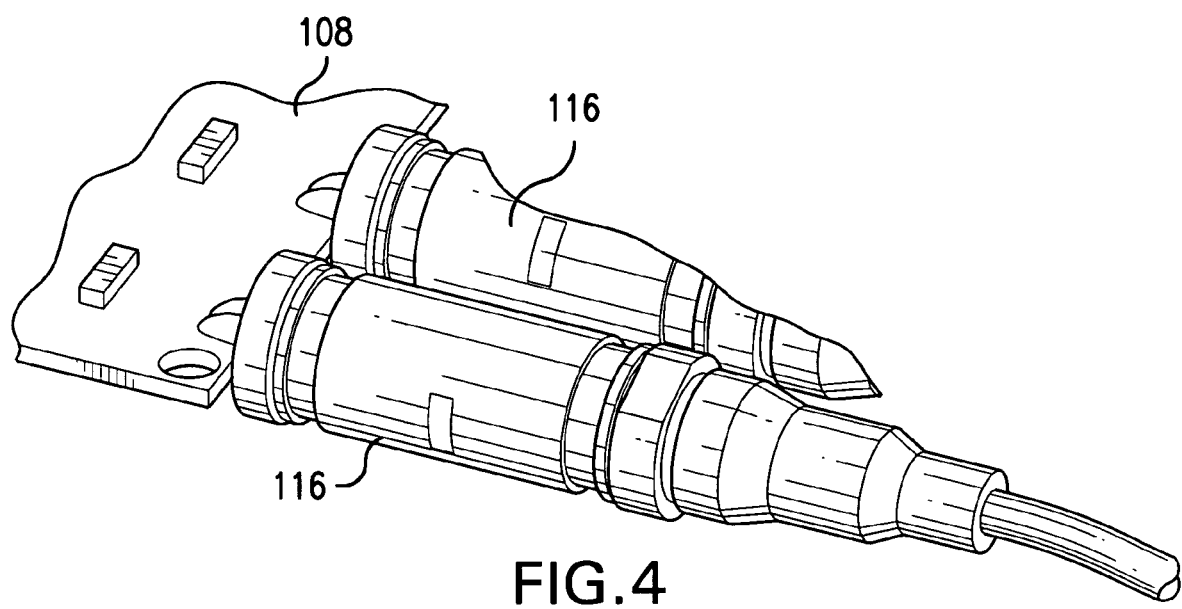
FIG. 4 is a cutaway perspective view of the transmitter subassembly.

Referring now to FIGS. 1 and 2, an exemplary optical transceiver module 100 is shown according to a preferred embodiment of the present invention. In this particular embodiment, the module 100 is compliant with the IEEE 802.3ae 10 GBASE-LX4 Physical Media Dependent sublayer (PMD) and the XENPAK (TM) form factor. It is to be noted, however, that the transceiver module 100 may be configured to operate under various other compliant protocols (such a Fibre Channel or SONET) and be manufactured in various alternate form factors such as X2. The module 100 is preferably a 10 Gigabit Coarse Wavelength Division Multiplexed (CWDM) transceiver having four 3.125 Gbps distributed feedback lasers and provides 300 meter transmission over legacy installed multimode fiber and from 10 to 40 km over standard single mode fiber.

The transceiver module 100 includes a two-piece housing 102 with a base 104 and a cover 106. In addition, contact strips 152 are provided to ground the module to chassis ground as well. The housing 102 is constructed of die-cast or milled metal, preferably die-cast zinc, although other materials also may be used, such as specialty plastics and the like. Preferably, the particular material used in the housing construction assists in reducing EMI. Further EMI reduction may be achieved by using castellations (not shown) formed along the edges of the housing 102.

The front end of the housing 102 includes a faceplate 132 for securing a pair of receptacles 124, 126. The receptacles 124, 126 are configured to receive fiber optic connector plugs 128, 130. In the preferred embodiment, the connector receptacle 128, 130 is configured to receive industry standard SC duplex connectors (not shown). As such, keying channels 132 and 134 are provided to ensure that the SC connectors are inserted in their correct orientation. Further, as shown in the exemplary embodiment and discussed further herein, the connector receptacle 130 receives an SC transmitting connector and the connector plug 128 receives an SC receiver connector.

Figure 5:
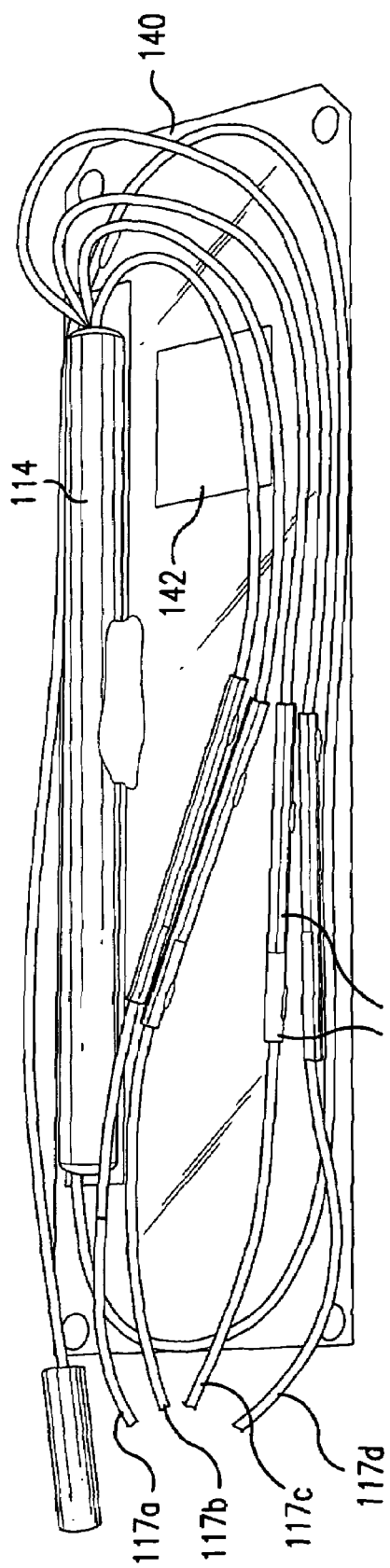
FIG. 5 is a top view of the flexible substrate for securing the optical fibers.
Figure 6:
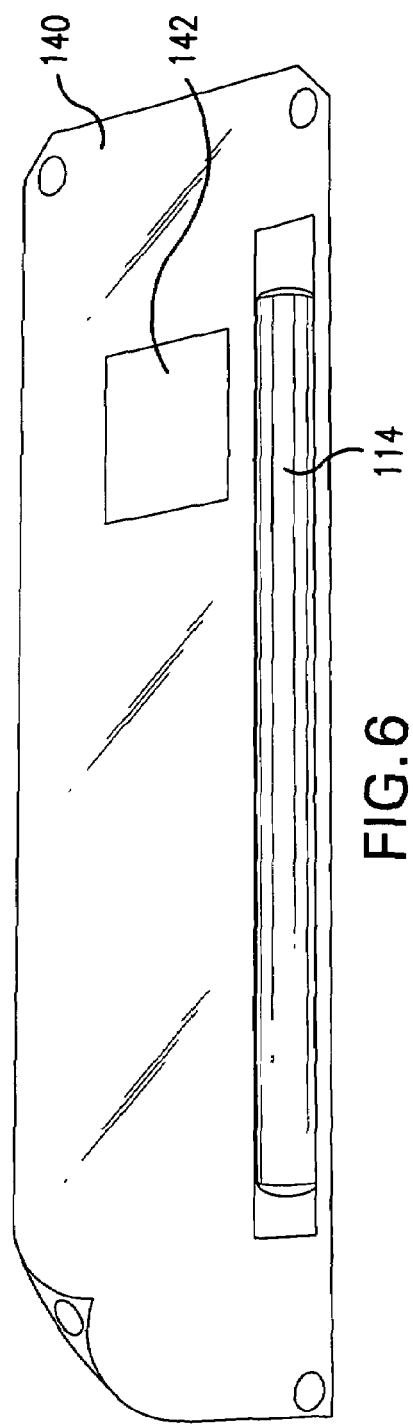
FIG. 6 is a rear view of the flexible substrate of FIG. 5.

In particular, the housing 102 holds three circuit boards, including a transmit board 108, a receive board 110 and a physical coding sublayer (PCS)/physical medium attachment (PMA) board 112, which is used to provide an electrical interface to external electrical systems (not shown). An optical multiplexer (MUX) 114 interfaces to the transmit board 108 via an assembly of four distributed feedback (DFB) lasers 116 in TO-cans. The lasers 116 are secured in place at the bottom of the housing 102 using a laser brace 118. The laser brace 118 also functions as a heat sink for cooling the lasers 116. In addition, the transmit board 108 and receive board 110 are connected to the PCS/PMA board 112 by respective flex interconnect 120, or other board-to-board connectors. Thermally conductive gap pads 160 and 161 are provided to transmit the heat generated by the lasers or other components to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. As illustrated in FIGS. 1, 5 and 6, the output of the four lasers 116 is then input into the optical MUX 114. The MUX 114 is mounted on a flexible substrate 140. The substrate 140 may be an optical flexible planar material, such as Flex-Plane™ available from Molex, Inc. of Lisle, Ill., although other flexible substrate may be used as well. As shown, the optical fibers 117a, 117b, 117c, 117d originating from the laser assembly 116 and being input into the MUX 114 are mounted to the substrate 140. The output of the MUX 114, which is routed to the transmit connector plug 130, is also attached to the substrate 140. The fibers 117a, 117b, 117c, 117d are routed and attached in such a manner as to minimize sharp bends in the optical fibers to avoid optical loss and mechanical failure.

The substrate 140 includes an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover to contact a heat transmission gap pad 160, so as to provide access to the mounted components on the board. This area normally would be inaccessible if not for the opening 142. For example, a heat sink maybe installed in the Clock and Data Recovery components 202, 208 without interfering with the routing of the optical fibers on the substrate 140 and without removing the mounted substrate 140 to allow access to the PCS/PMA board 112.

Several additional advantages are realized in using the flexible substrate 140. In particular, attaching the fibers to the substrate 140, rather than allowing the fibers to move about freely within the transceiver module housing 102, neatly maintains the routing of the optical fibers to prevent unwanted tangling and breakage during assembly of the transceiver. Furthermore, attaching the optical fibers to the substrate 140 greatly reduces the stress on the fibers, thereby reducing the incidence of microcracks forming in the fiber coatings.

FIG. 2 illustrates an exemplary functional block diagram of the transceiver 100. As shown therein, the transceiver 100 includes a slave MDIO/MDC interface 200, which is interfaced to an off-board master MDIO/MDC 190, for controlling operation of the transceiver 100. The transmitting portion of the transceiver 100, which receives signals from the media access controller (MAC) 180, includes a clock and data recovery module 202 having XAUI lane alignment functionality, one or more laser drivers 204 for driving the DFB laser assembly 116 for outputting a beam. The receiving portion of the transceiver 100, which provides signals to the external MAC 180, includes a clock and data recovery module 208 having XAUI lane alignment functionality.

The clock data recovery module 208 receives signals from a quad transimpedance amplifier/limiting amplifier (TIA/LIA) 210, which receives signals from a quad InGaAs PIN 212. An optical demux 214 receives an optical beam on to the InGaAs PIN 212. The transceiver 100 communicates with the MAC 180 via a 10 Gigabit eXtended Attachment Unit Interface (XAUI) compatible electrical interface 188. Communication between the XAUI interface 188 and the MAC 180 is accomplished through an external IEEE 802.3ae-compliant 10 Gigabit Medium Independent Interface (XGMII) 184, XGMII eXtender Sublayer (XGXS) 186 and Reconciliation Sublayer 182.

The interchangeable PCS/PMA board 112 includes the MDIO/MDC 200, the Clock and Data Recovery Retimer circuits 202, 208 and an on-board reference clock operating at 156.25 MHz. Other protocols such as Fibre Channel may be supported by similar boards. The slave MDIO/MDC 200 interfaces to the master MDIO/MDC 190 using the IEEE Clause 45 electrical specifications and interfaces to the clock and data recovery modules 202, 208 using the IEEE Clause 22 electrical specification. The slave MDIO/MDC 200 also interfaces to the quad laser driver 204 and the quad TIA/LIA 210. A field programmable gate array (FPGA) or microcontroller may be used to implement the slave MDIO/MDC functions. Furthermore, the MDIO/MDC 200 interfaces to an EEPROM 201 or other nonvolatile memory for additional functionality. For example, the EEPROM 201 may be used for implementing control and diagnostic capabilities staring configuration parameters, manufacturing data, serial numbers, or other data within the transceiver itself.

The MDIO/MDC 200 enables highly secure operation of the transceiver 100 as a slave device to the off-board master MDIO/MCD 190. A particular advantage of the master/slave configuration of the MDIO devices in the present invention is that the FPGA allows one to control the laser and other transceivers functions, and prevents reprogramming by malicious programs or functions from external sources. This is possible since only predetermined functions or programs, which the operator deems authorized, are available for execution on the slave MDIO/MDC 200.

The transmit board 108 includes the quad laser driver 204 through which the four DFB laser assembly 116 interfaces to the transmit board 108. Advantageously, because of the configuration of using four separate lasers, as opposed to a single laser, lower speed and lower cost drivers may be used, and at greater distance goals.

One of the transceiver form factor types for the 10 Gigabit Ethernet market is the XENPAK LX4 transceiver. This transceiver is based on wide wavelength division multiplexing (WWDM), where the optical signal is composed of four widely spaced wavelengths transmitted over a single optical fiber. The receiver requires the light from the single fiber to be split, or demultiplexed, onto individual photodetectors. Each photodetector converts its respective optical signal into an electrical signal.

In the case of WWDM receive sections, there needs to be a separate photodetector for each wavelength. It is evident that the use of photodetectors in separate hermetic cans would result in a large receive section for such multi-wavelength receivers. Instead, the present invention has taken the approach of using a single bare multi-element photodiode array 220 mounted directly to the circuit board 222 containing the amplifier/limiter circuit.

Referring to FIGS. 1 and 3-6, the receiver subassembly 224 with the circuit board 222 acts as an optical bench for the attachment and alignment of the demultiplexer 226 to the photodiode array 220. In particular, there is shown a miniature optical demultiplexer 226 aligned to the photodiode array 220, resulting in a compact receive section. The circuit board 222 not only serves as a substrate for the electrical circuitry, but also serves as an optical bench for the optical components. Particularly, the surface of the circuit board 222 acts as the optical reference plane 228 for the optical components. Optionally, the receiver board 222 is a printed circuit board (PCB) formed from PCB materials having higher glass content and providing less signal loss under high frequency (RF) operation compared to less expensive PCB materials. A suitable material is Rogers RO4003, available from Rogers Corp. of Chandler, Ariz., which is less expensive than either ceramic or silicon. The use of ceramic or silicon provides the ability to make the package hermetic.

The surface of the circuit board 222 is the optical reference plane 228. The top surface of the photodiode array 220 is set to a predetermined height by controlling its thickness to within 50 microns and the thickness of its attachment material such as glue or solder 230. The demultiplexer 226 is also attached to this surface. The demultiplexer output 232 is thus at a predetermined height of within 50 microns above the photodiode array 220.

More particularly, the photodiode array 220 has a variable thickness from lot to lot and is attached to the circuit board 222 with epoxy, solder or eutectic metal bonding of variable thickness. The thickness of the bond material is manufactured to a controlled thickness such that the active surface of the photodiodes is at a predetermined height above the circuit board surface so as to match the focus distance. The miniature optical demultiplexer 226 is then aligned relative to the active areas of the photodiode array 220 in a plane parallel to the photodiode array surface. The demultiplexer 226 has a precise thickness such that when it rests on the optical reference plane 228 defined by the circuit board surface, the optical exit surfaces of the demultiplexer 226 are at the correct height above the photodiode array 220.

The demultiplexer 226 utilized and implemented in the present invention is preferably that described in U.S. Pat. No. 6,542,306, hereby incorporated by reference, and includes an optical block with an upper surface and a lower portion. The optical block has at least one optical element and a plurality of wavelength selecting elements and reflectors. The optical block is specifically positioned on top of a beam-directing member. In the preferred embodiment of the present invention, both the optical block and beam-directing member are optically transparent.

In particular, as described in the above noted U.S. patent, at least one optical element is disposed generally on the upper surface of the optical block. Its function is primarily to focus and direct a multi-wavelength optical signal along a prescribed optical signal path. Further, the wavelength selecting elements are disposed generally below the upper surface of the optical block. The wavelength selecting elements are designed and operative to receive the optical signal from the optical element. Moreover, a plurality of reflectors are disposed generally on the upper surface of the optical block and opposite from the wavelength selecting elements. Due to such strategic positioning and orientation, the reflectors are able to direct the optical signal from one wavelength selecting element to an adjacent wavelength selecting element. Thereafter, the beam-directing member, which is disposed about the lower portion of the optical block, operates to redirect and focus the optical signal from the wavelength selecting elements to the photodiode array 220. Although the demultiplexer described above is preferred, other optical configurations for demultiplexing the signals may be used as well, and such alternative configurations are within the scope of the present invention.

The present invention implements the transceiver 100 utilizing the four standard, commercially available fiber pigtailed lasers 116 which interfaces to a Fused Biconic Tapered (FBT) coupler 114 to collect and multiplex laser radiation into a single fiber. The fiber that is used in the fiber pigtailed lasers 116 and the FBT 114 is affixed to the flexible substrate material 140. This prevents fiber tangling and breakage while remaining flexible and therefore easy to work with. The flexible substrate material 140 may be an optical flexible planar material, such as FlexPlane™ available from Molex, Inc, of Lisle, Ill., or Kapton™ available from E. I. Dupont de Nemours and Company of Wilmington Del. Other flexible substrates may be used as well. A conforming coating is used over the entire flex 140 is used to secure the fibers to the flex 140.

As previously noted above, several additional advantages are realized when using the flexible substrates 140 rather than allowing the fibers to move about freely within the transceiver module housing 102, neatly maintains the routing of the optical fibers to prevent unwanted tangling. Furthermore, attaching the optical fibers to the substrate 140 greatly reduces the stress on the fibers, thereby reducing the incidence of microcracks forming in the fiber coatings. The fibers are routed and attached in such a manner as to minimize sharp bends in the optical fibers.

Attached modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention. Various aspects of the techniques and apparatus associated with the protocol processing aspect of the invention may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or web site which may be downloaded to the transceiver automatically or on demand. The foregoing techniques may be performed, for example, single central processor, a multiprocessor, on or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specifically designed application-specific integrated circuits (ASICS).

It will be understood that each of the elements described above, or two or more together, also may find a useful application in other types of constructions differing from the types described above.

While the invention has been illustrated and described as embodied in a transceiver for an optical communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. An optical transceiver for converting and coupling an information-containing electrical signal with an optical fiber comprising:
   a housing including an electrical connector for coupling with an external electrical cable or information system device and for transmitting and/or receiving an information-containing electrical communications signal, a fiber optic connector adapted for coupling with an external optical fiber for transmitting and/or receiving an optical communications signal, and a base member and a cover member forming a XENPAK pluggable module;
   at least one electro-optical subassembly in the housing for converting between an information-containing electrical signal and a modulated optical signal corresponding to the electrical signal;
   a communications protocol processing subassembly in the housing for processing the communications signal into a predetermined electrical or optical communications protocol, wherein the protocol processing subassembly is compliant with IEEE 802.3ae 10 GBASE-LX4;
   wherein one of said electro-optical subassemblies is a receiver subassembly including:
   an optical demultiplexer coupled to said fiber optic connector for receiving a multi-wavelength optical signal having a plurality of information-containing signals each with a different predetermined wavelength and demultiplexing the optical signal into distinct optical beams corresponding to said predetermined wavelengths;
   a substrate forming an optical reference plane and including a plurality of photodiodes each of which is disposed on the substrate in the path of a distinct optical beam, the photodiodes functioning to convert the respective optical signals into an electrical signal that is coupled to said electrical connector for transmitting the electrical signal to an electrical cable or external information system device; and
   an array of individual photodiodes and wherein the optical demultiplexer includes an optical block with a plurality of wavelength selecting elements and reflectors operative to direct the optical beams from each respective wavelength selecting element to respective ones of a plurality of spatially separated image positions corresponding to the locations of the individual photodiodes.

2. A transceiver as defined in claim 1, wherein one of said electro-optical subassemblies is a transmitter subassembly including first and second lasers operating at different wavelengths and modulated with respective first and second electrical signals for emitting first and second laser light beams; and an optical multiplexer for receiving said first and second beams and multiplexing the respective optical signals into a single multi-wavelength beam that is coupled to said fiber optic connector for transmitting the optical signal to an external optical fiber.

3. A transceiver as defined in claim 1, wherein the electro-optical receiver subassembly is implemented on a single hermetically sealed printed circuit board.

4. A transceiver as defined in claim 1 wherein the array of individual photodetectors is a single bare multi-element photodiode array.

5. An optical transceiver for converting and coupling an information-containing electrical signal with an optical fiber comprising:
   a housing including an electrical connector for coupling with an external electrical cable or information system device and for transmitting and/or receiving an information-containing electrical communications signal, a fiber optic connector adapted for coupling with an external optical fiber for transmitting and/or receiving an optical communications signal, and a base member and a cover member forming a XENPAK pluggable module;
   at least one electro-optical subassembly in the housing for converting between an information-containing electrical signal and a modulated optical signal corresponding to the electrical signal; and
   a communications protocol processing subassembly in the housing for processing the communications signal into a predetermined electrical or optical communications protocol, wherein the protocol processing subassembly is compliant with IEEE 802.3ae 10 GBASE-LX4;
   wherein an electro-optical subassembly includes a plurality of lasers with each laser emitting a laser beam of different wavelength; and an optical multiplexer for receiving and multiplexing the respective laser beams into a single multi-wavelength beam that is coupled to the fiber optic connector for transmitting the single beam to an external optical fiber; a plurality of optical fibers disposed within the housing extending between, the plurality of lasers and the optical multiplexer; and a flexible substrate disposed within the housing for mounting the optical fibers thereto so as to prevent tangling of the optical fibers within the housing.

6. A transceiver as defined in claim 5, wherein the optical multiplexer is supported on said flexible substrate.

7. A transceiver as defined in claim 5, wherein the flexible substrate has at least one aperture, sized and configured to allow at least one component located underneath the flexible substrate to make physical contact with a heat sink on the housing.

8. A transceiver as defined in claim 5, further comprising a photodiode array disposed on a printed circuit board in said receiver; and a demultiplexer disposed in the receiver subassembly and positioned with respect to the optical reference plane defined by the surface of the printed circuit board surface, so that the output beam from the demultiplexer focuses on the photodiode array.

9. A transceiver as defined in claim 5, further comprising a first thermally conductive gap pad disposed between one of said electro-optical subassemblies and said housing through an opening in said flexible substrate for dissipating heat from said one subassembly to the housing.

10. A transceiver as defined in claim 9, further comprising a second thermally conductive gap pad disposed between another subassembly and said housing.

11. A transceiver as defined in claims 1 or 5, wherein the protocol processing subassembly is implemented on a single interchangeable printed circuit board.

12. An optical transceiver for converting and coupling an information-containing electrical signal with an optical fiber comprising:
- a housing including an electrical connector for coupling with an external electrical cable or information system device and for transmitting and/or receiving an information-containing electrical communications signal, a fiber optic connector adapted for coupling with an external optical fiber for transmitting and/or receiving an optical communications signal, and a base member and a cover member forming a XENPAK pluggable module;
- at least one electro-optical subassembly in the housing for converting between an information-containing electrical signal and a modulated optical signal corresponding to the electrical signal;
- a communications protocol processing subassembly in the housing for processing the communications signal into a predetermined electrical or optical communications protocol, wherein the protocol processing subassembly is compliant with IEEE 802.3ae 10 GBASE-LX4; and
- a thermally conductive gap pad disposed between one of said subassemblies and said housing for dissipating heat from said one subassembly.

13. A transceiver as defined in claims 1, 5 or 12, further comprising a flexible electrical interconnect between said at least one electro-optical subassembly and said communications processing subassembly.

14. A transceiver as defined in claims 1, 5 or 12, further comprising a rigid electrical interconnect between said at least one electro-optical subassembly and said communications processing subassembly to allow modular configuration the transceiver by utilizing interchangeable subassemblies capable of attachment by said interconnect.

15. An optical transceiver for converting and coupling an information-containing electrical signal with an optical fiber comprising:
- a housing including an electrical connector for coupling with an external electrical cable or information system device and for transmitting and/or receiving an information-containing electrical communications signal, a fiber optic connector adapted for coupling with an external optical fiber for transmitting and/or receiving an optical communications signal, and a base member and a cover member forming a XENPAK pluggable module;
- at least one electro-optical subassembly in the housing for converting between an information-containing electrical signal and a modulated optical signal corresponding to the electrical signal; and
- a communications protocol processing subassembly in the housing for processing the communications signal into a predetermined electrical or optical communications protocol, wherein the protocol processing subassembly is compliant with IEEE 802.3ae 10 GBASE-LX4;
- wherein one of said subassemblies is directly mounted on said housing using a thermally conductive material.

16. A pluggable optical transceiver for converting and coupling an information-containing electrical signal with an optical fiber comprising:
- a pluggable housing including an electrical connector for coupling with an external electrical cable or information system device and for transmitting and/or receiving an information-containing electrical communications signal, and a pair of fiber optic connectors adapted for coupling with first and second external optical fibers for transmitting and/or receiving an optical communications signal; and
- an electro-optical subassembly in the housing for converting between an information-containing electrical signal and a modulated optical signal corresponding to the electrical signal including:
  - (a) a transmitter subassembly including first and second lasers operating at different wavelengths and modulated with respective first and second electrical signals for emitting first and second laser beams; and an optical multiplexer for receiving said first and second beams and multiplexing the respective optical signals into a single multi-wavelength beam that is coupled to one of said fiber optical connectors for transmitting the optical signal to one of the external optical fibers, at at least a 10 Gigabit data rate, and
  - (b) a receiver subassembly including an optical demultiplexer coupled to a second one of said fiber optic connectors for receiving a multi-wavelength optical signal having a plurality of information-containing signals each with a different predetermined wavelength and demultiplexing the optical signal into distinct optical beams corresponding to said predetermined wavelengths; and a substrate forming an optical reference plane and including an array of individual photodiodes each of which is disposed on the substrate in the path of a distinct optical beam, the photodiodes functioning to convert the respective distinct optical signals into an electrical signal that is coupled to a protocol processing subassembly which is coupled to said electrical connector for transmitting the electrical signal to an electrical cable or external information system device, and wherein the optical demultiplexer includes an optical block with a plurality of wavelength selecting elements and reflectors operable to direct the optical beams from each respective wavelength selecting element to respective ones of a plurality of spatially separated image positions corresponding to the locations of the individual photodiodes.

17. The pluggable optical transceiver of claim 16 wherein the pluggable housing is compliant with the XENPAK form factor.

18. The pluggable optical transceiver of claim 16 wherein the pluggable housing has maximum dimensions of approximately 51.3 millimeters by 22.4 millimeters by 121 millimeters.

19. The pluggable optical transceiver of claim 16 comprising:
- a plurality of optical fibers disposed within the pluggable housing extending between the first and second lasers and the optical multiplexer; and
- a flexible substrate disposed within the housing for mounting the optical fibers thereto.

20. The pluggable optical transceiver of claim 19 wherein the optical multiplexer is supported on the flexible substrate.

21. An optical transceiver for converting and coupling an information-containing electrical signal with an optical fiber comprising:
- a housing including an electrical connector for coupling with an external electrical cable or information system device and for transmitting and/or receiving an information-containing electrical communications signal, and a fiber optic connector adapted for coupling with an external optical fiber for transmitting and/or receiving an optical communications signal;

a modular electro-optical subassembly detachably disposed in the housing for converting between an information-containing electrical signal and a modulated optical signal corresponding to the electrical signal; and a modular, interchangeable communications protocol processing subassembly detachably disposed in the housing for processing the communications signal into a predetermined electrical or optical communications protocol supporting at least a 10 Gigabit data rate, wherein the electro-optical subassembly and the protocol processing subassembly allow the transceiver to be reconfigured;

wherein one of the electro-optical subassemblies is a receiver subassembly including an optical demultiplexer coupled to the fiber optic connector for receiving a multi-wavelength optical signal having a plurality of information-containing signals each with a different predetermined wavelength and demultiplexing the optical signal into distinct optical beams corresponding to the predetermined wavelengths; and a substrate forming an optical reference plane and including a plurality of individual photodiodes each of which is disposed on the substrate in the path of a distinct optical beam, the photodiodes functioning to convert the respective optical signals into an electrical signal that is coupled to the electrical connector for transmitting the electrical signal to an electrical cable or external information system device;

wherein the optical demultiplexer includes an optical block with a plurality of wavelength selecting elements and reflectors operative to direct the optical beams from each respective wavelength selecting element to respective ones of a plurality of spatially separated image positions corresponding to the locations of the individual photodiodes.

22. An optical transceiver as defined in claim 21, wherein one of the electro-optical subassemblies is a transmitter subassembly including first and second lasers operating at different wavelengths and modulated with respective first and second electrical signals for emitting first and second laser light beams; and an optical multiplexer for receiving the first and second beams and multiplexing the respective optical signals into a single multi-wavelength beam that is coupled to the fiber optic connector for transmitting the optical signal to an external optical fiber.

23. An optical transceiver as defined in claim 21 wherein the housing has maximun dimensions of approximately 51.3 millimeters by 22.4 millimeters by 121 millimeters.

* * * * *